Feb. 11, 1936. W. A. WEIGHTMAN 2,030,339
JIG
Filed June 13, 1932
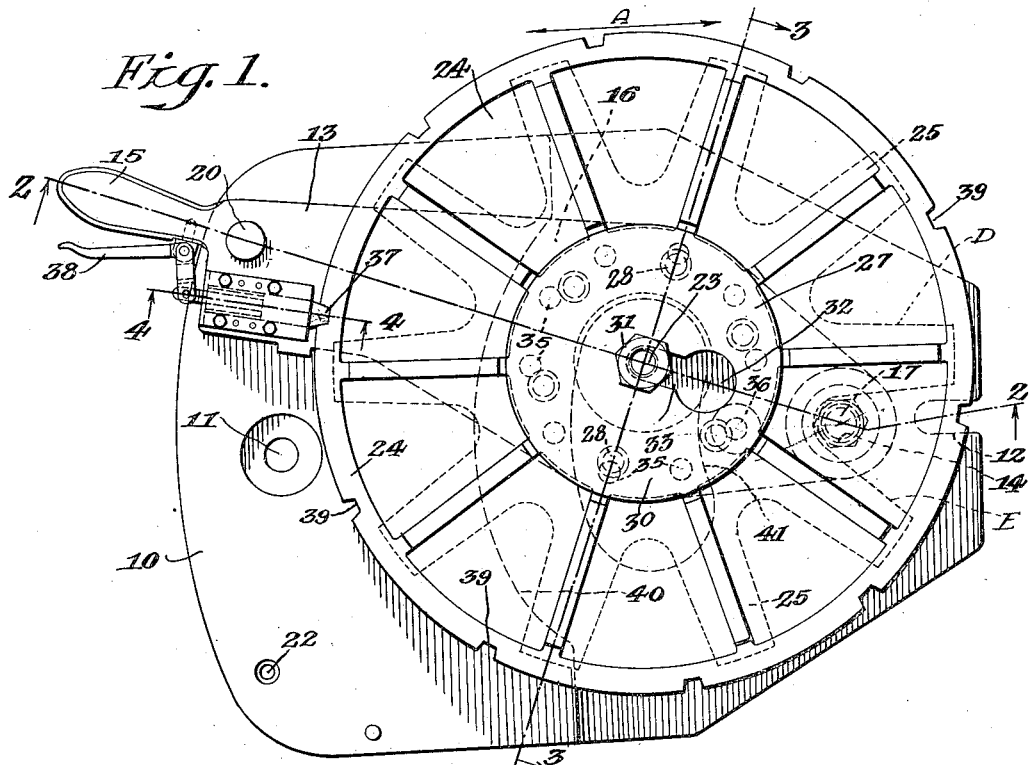
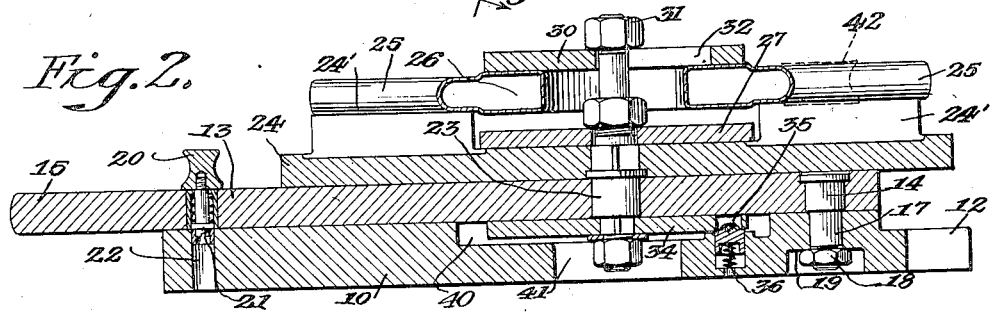
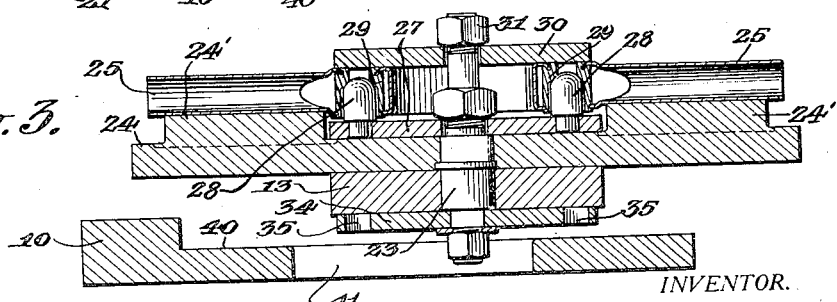
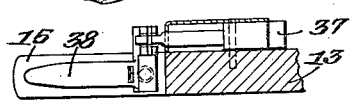
INVENTOR.
William A. Weightman
BY John P. Tarbox.
ATTORNEY.

Patented Feb. 11, 1936

2,030,339

UNITED STATES PATENT OFFICE 2,030,339

JIG

William A. Weightman, Detroit, Mich., assignor to Budd Wheel Company, Philadelphia, Pa., a corporation of Pennsylvania Application June 13, 1932, Serial No. 616,879

5 Claims. (Cl. 90—59)

My invention relates primarily to metal vehicle wheels and to certain of the steps in the fabrication of welded artillery wheels. Further, it relates to means for adjustably supporting an artillery wheel spider during the removal of the weld flash therefrom.

It is well known in the art to construct metal spoked wheels by welding together the contiguous edges of a pair of complementally shaped sheet metal stampings of spider formation. The welding of these stampings unites them into a unitary wheel spider having hollow spokes and a hollow central portion, commonly termed a nave. Generally, a fairly heavy weld flash is extruded along the line of contact of the stampings in the median plane of the spider, and this flash must be removed from the exterior of the wheel before the remaining fabrication steps leading up to the finishing of the wheel are carried out. The interior flash need not be totally removed as it is concealed from sight. It is to the simple and efficient removal of the exterior flash to which my invention is directed.

The prime object of my invention is the provision of means whereby the removal of the exterior flash from a welded artillery spider is facilitated. Other and incidental objects relate to improvements over the prior art in detail and in arrangement of parts.

Broadly, I have achieved the objects of my invention by providing a jig fixture adapted to be mounted on the reciprocating table of a milling machine, preferably of the spindle type. They have been further achieved by a novel and efficient arrangement of parts.

Other objects and advantages of my invention will be apparent after a reading of the subjoined specification in the light of the attached drawing, in which Figure 1 is a plan view of the mechanism comprising my invention.

Figure 2 is a detail sectional view of my device taken on line 2—2 of Figure 1.

Figure 3 is a detail sectional view taken on line 3—3 of Figure 1.

Figure 4 is a detail view of the locking mechanism comprising part of my invention.

Several different methods have been evolved for the removal of the weld flash from artillery wheel spiders. These methods include shearing or cutting the weld from the wheel body, sandblasting or grinding the flash. While these methods are each successful in a measure, it has generally been found that milling and/or grinding the flash has resulted in a greater proximity to complete removal than has any other method.

My invention is preferably illustrated in connection with milling or grinding of the flash and is shown as closely related to a spindle milling machine. While the milling machine per se is not illustrated in the accompanying drawing, anyone skilled in the art can appreciate the general arrangement, particularly in view of the following specification. The type of milling machine to which my invention is particularly applicable is that type embodying a vertical spindle and a reciprocating table movable with respect to the vertical spindle, which, of course, rotates in a given position, the work being moved into and out of operative position by the reciprocating table.

Roughly speaking, my invention consists in providing a base adapted to be secured to the reciprocating table of the milling machine, a lever pivoted to the base at one end thereof, and a rotatable jig fixture fixed to the lever and allowing a wide range of movement calculated to bring different parts of the work piece successively into engagement with the tool, in order to form the necessary operations upon the work.

More specifically, referring to the drawing by reference numerals, I have provided a flat base 10 adapted to be secured to the reciprocating table through bolt holes 11 and slotted portions 12. Lever 13, pivotally secured to the forward end of base 10, as at 14, is provided with a handle portion 15 and a central enlarged portion 16 intermediate its ends. The pivoting of lever 13 is provided by a shouldered stud 17 seated in a recessed portion of the lever, and secured at its lower end by a nut 18 seated in the recessed portion 19 of the base 10. Adjacent the handle portion 15 of lever 13, a position locating pin 20 is provided, and embodies the usual spring arrangement whereby a yieldable plunger 21 is normally held in a hole 22 to locate the angular position of lever 13. The position of lever 13 may be changed by grasping the handle 15, pulling the pin 20 upward in order to remove plunger 21 from hole 22 and swinging the lever 13 in a horizontal plane to the desired position.

The enlarged central portion 16 of lever 13 is provided with an elongated shouldered stud 23, which holds in assembled relationship the various parts about to be described. These parts comprise a jig mechanism consisting of an annular table 24 having radially extending seating portions 24' on which the spokes 25 of the welded artillery wheel body 26 are adapted to seat, and a central annular member 27 having an annular series of equally spaced vertically extending pilot pins 28 adapted to pilot the securing portions of the wheel body, indicated by numeral 29. The jig fixture further consists in a top plate 30 which may be easily removed from stud 23 by loosening nut 31 and sliding plate 30 to a position where the nut 31 will pass through the enlarged portion 32 of slot 33.

A locating device is secured to the lower end of stud 23, and consists of a plate 34 having holes 35 with which coacts a spring plunger 36 in base 10. This plunger 36 is depressed against its supporting spring by lateral pressure from the wall of hole 35 and thus is retracted merely by moving lever 13, the table 24 being positively held against rotation relative to the lever 13 by spring plunger 37. Spring plunger 37, which prevents rotation of table 24 relative to lever 13 is operated through an appropriate system of levers by handle 38 adjacent the handle portion 15 of lever 13. This spring plunger 37 coacts with a series of notches 39 in the outer peripheral portion of table 24. It will be seen that I provide a number of notches equal to the number of spokes in the work piece.

The base 10 is provided with a stepped portion 40 and an arcuate slotted portion 41 which accommodates the lower end of stud 23. The tool of a standard milling cutter is indicated diagrammatically at 42 and it will be apparent that in the position shown the tool is coaxially disposed with respect to pivot pin 17.

Inasmuch as the respective spokes of an artillery wheel spider diverge from each other, provision must necessarily be made for changing the position of the spokes in order that the straight reciprocation afforded by the milling table may be employed in order to obtain a cut around the diverging sides of adjacent spokes. As shown in Figure 1, the reciprocation of the table is preferably in the direction of arrow A. Lever 13 is susceptible of movement between two positions, the first position as seen in Figure 1 and the second position corresponding to that wherein lever 13 is moved and locked at the point 22. While lever 13 is in the initial position, the wheel spider 26 is placed in position on table 24, and locked in place by means of pilot pins 28, and plate 30, held by nut 31 on the end of stud 23. As the milling table advances toward the constantly rotating cutter 42, the side of spoke D is brought into contact therewith, and the weld flash is cut off uniformly as the table progresses toward an innermost position. The rotary cutter 42 is preferably of a radius equal to the radius of the arc joining the inner ends of the spokes 25.

As rotary cutter 42 reaches the arcuate portion joining the inner ends of the spokes 25, the milling table stops in its travel. At this point lever 13 is swung to final position, by pulling out pin 20 and plunger 21 and rotating the lever to the new position marked by hole 22. As the table 24 during this movement is locked by plunger 37 against rotation relative to lever 13, the side wall of hole 35 strikes against the plunger 36 with sufficient force to depress the latter against its spring and into its recess, thus permitting plate 34 to oscillate with lever 13 around the pivot of the latter. When the plunger 21 reaches the hole 22 shown in the lower left hand portion of Fig. 1, the plunger drops into the hole and simultaneously plunger 36 springs up in to the next succeeding hole 35 of plate 34. The side of the next adjacent spoke E is now disposed in parallel relationship to the line of reciprocation of the milling table, and, as the table travels back from its innermost position, the flash on the side of spoke E is cut off. After completely removing the flash from between two adjacent spokes D and E, lever 13 is returned to initial position, and table 24 is rotated to the next position. In moving lever 13 the operator draws plunger 21 from hole 22 and grasps handles 15 and 38 together bringing the latter close to the former and thus withdrawing plunger 37 from notch 39. This releases table 24 for rotation relative to lever 13. Movement of lever 13 is thus accomplished to the position shown in Fig. 1. At the same time plunger 36 retains engagement with hole 35 in plate 34. Plate 34 and table 24 being keyed together thus are moved by plunger 36 angularly about axis 23 and this brings spoke D into the position shown for spoke E in Fig. 1. At the same time the next adjacent spoke occupies the position formerly held by spoke D. While it would appear that because the holes 35 are concentric about the axis 23 and the pin 36 is fixed against angular movement in the base 10, there could not be continuity of engagement throughout the angular range of movement of the lever 13. It will be noted not only that the head of the plunger 36 is relatively of considerably smaller diameter than the holes 35, but also that this head is of relatively shallow curved cross section presenting much inclined side walls. Thereby there exists ample lost motion and ease of relative movement to take care of the relatively small angular movement of the lever 13 as compared with the whole circle without dis-engaging the parts. It will also be noted that pin 36 lies approximately mid-way between the two angular positions of lever 13 as defined by pins 22 and that in each of its positions lever 13 has its angle accurately fixed by the engagement of pin 21 in a hole 22 and therefore that accurate registry of plunger 36 with holes 35 is not required for this purpose. This alternate reciprocation, moving of the lever 13, and rotation of the table 24 is continued until the entire series of spokes have been operated upon. It will be seen that the spring plunger 36 coacting with holes 35 in plate 34, will serve to aid in locating the correct angular position of lever 13 with respect to base 10. It is positively locked in such position by the action of plunger 21 in the various holes 22 in base 10.

It will be seen that by simply changing the position of lever 13 from initial position to final position while the milling table is at its innermost position, the sides of adjacent spokes will be brought into operative position with respect to the rotary cutter 42 so that the wheel virtually cuts in on one side of the spoke D and back out on the adjacent side of spoke E.

Summarizing, it will be seen that I have provided a very novel and efficient jigging arrangement for the cleaning of welded artillery wheel spiders, and it is to be distinctly understood that this arrangement may be applicable for other types of work pieces than artillery wheels. For instance, gears or other annular objects having radially extending projections might be cleaned in a manner similar to this. The objects of the invention have been achieved in full. I have provided an extremely simple yet efficient device for bringing successive parts of the wheel body into operative position with respect to a rotary cutter and also I have utilized a pivoted arrangement whereby an irregularly shaped work piece may be operated upon by a rotary cutter rotating on a fixed axis. Other achievements are incidental to improvements in design, and are at once recognized.

Modifications of the invention will be apparent to those skilled in the art, and the appended claims therefore should be read with a breadth of understanding commensurate with the generic spirit of my invention.

What I claim is:

1. A jig fixture for holding work upon which machine operations are to be performed by the same tool through relative reciprocation of the work and the tool upon parts of the work disposed at an angle to each other, comprising a base, an oscillatable member pivoted on an axis at right angles to the base, a work holder fixed to said oscillating member for angular movement with respect thereto about an axis located at one side of the pivotal axis of said oscillating member, means to support the work from the work holder in a position in which the line connecting the pivot of said member and the axis of movement of said work holder substantially bi-sects the angle between the parts of the work to be operated upon, and means defining two positions of said oscillable member spaced apart angularly about the pivot of said member by an angle equal to the said angle between the parts of the work to be operated upon.

2. A jig fixture according to claim 1 in which the oscillable member is a lever and the axis upon which the work holder is mounted lies on the lever toward its free end from the pivotal axis of the lever.

3. A jig fixture according to claim 1 in which coacting means between the base and the work holder is utilized to shift the work holder when the oscillable member is shifted.

4. A jig fixture according to claim 1 in which the shifting means between the base and the work holder is yielding, and a locking detent operable from the oscillating member normally prevents relative angular movement between the oscillable member and the work holder.

5. A jig fixture according to claim 1 in which the means for fixing the range of movement of said oscillating member lies without the axial projection of the work holder and between it and the free end of the oscillable member.

WILLIAM A. WEIGHTMAN.